Figure 1:
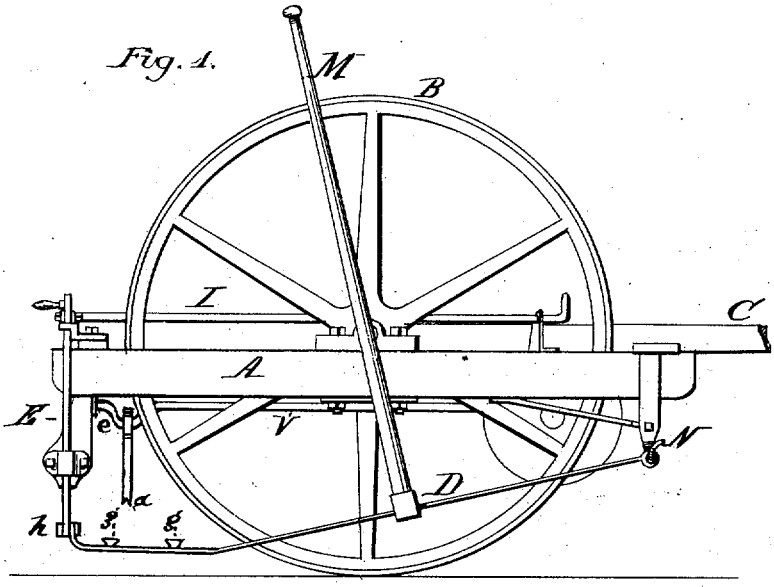

2 Sheets--Sheet 1.

J. GORE.
Harvester.

No. 6,640. Reissued Sept. 14, 1875.

Witnesses:
W. H. Isaacs
J. Orlando Harrisson

Inventor:
John Gore
by his atty
E. F. Kenwick

N. PETERS, PHOTO-LITHOGRAPHER, WASHINGTON, D. C.

J. GORE.
Harvester.

No. 6,640.

Reissued Sept. 14, 1875.

Witnesses:
W. H. Isaacs
J. Orlando Harrisson

Inventor:
John Gore
by his Atty
E. S. Renwick

N. PETERS, PHOTO-LITHOGRAPHER, WASHINGTON, D. C.

UNITED STATES PATENT OFFICE.

JOHN GORE, OF BRATTLEBOROUGH, VERMONT.

IMPROVEMENT IN HARVESTERS.

Specification forming part of Letters Patent No. 26,582, dated December 27, 1859; reissue No. 1,129, dated January 15, 1861; extended 7 years; reissue No. 6,640, dated September 14, 1875; application filed May 17, 1875.

*To all whom it may concern:*

Be it known that I, JOHN GORE, of Brattleborough, Windham county, State of Vermont, have made an invention of certain new and useful Improvements in Grain and Grass Harvesters; and that the following is a full, clear, and exact description and specification of the same.

My said improvements have reference to the means of turning up the outer end of the finger-beam of that class of harvesters in which the main frame or driver's platform is supported on two running-wheels, both at one end of the finger-beam, and is connected with a stiff tongue or draft-pole, so as to run parallel with the surface of the ground or thereabout; also, to the means for raising the inner end of the finger-beam in the same class of harvesters; also, to the means of driving the reciprocating cutter of harvesters without straining the crank-pin, notwithstanding the twisting or rocking of the cutter-bar. To these ends my improvements consist of certain combinations of instrumentalities, which are specified at the close of this specification.

The said instrumentalities are the following, viz: First, the main frame or driver's platform of the harvester; second, two running-wheels therefor; third, a tongue or draft-bar connected rigidly with said frame, so that the latter is prevented from oscillating relatively to the tongue on the axle of the driving-wheels, as the cutter rises and descends in passing over inequalities of the ground; fourth, a finger-beam arranged to project laterally from one side of the main frame, and at one side of both the running-wheels thereof; fifth, a link hinged to the inner end of the finger-beam by a pivot; by means of this link the finger-beam is held in its proper endwise position laterally of the main frame, with the capacity of being raised and lowered relatively to the said frame, and of having its outer end turned up or down upon the hinge-pivot which forms the connection between the said link and the inner end of the finger-beam; sixth, a hand-lever connected with the finger-beam for turning up the outer end thereof; seventh, a lever connected with the main frame to enable the driver to raise the finger-beam from said frame; eighth, the reciprocating cutter bar or stock with which the cutter-blades are connected; ninth, the crank-pin for driving the reciprocating cutter bar or stock; tenth, the connecting-rod for transmitting motion to said cutter-bar from the said crank-pin; eleventh, a swivel journal-box for the connecting-rod, having the axis of its pivots arranged longitudinally of the connecting-rod, so that the connecting-rod may twist upon said pivots instead of straining the crank-pin.

In order that my said invention may be understood, I have represented in the accompanying drawing, and will proceed to describe, the principal members of a harvesting-machine embodying my new combinations in the best form known to me at the date of my application for the original patent.

The parts of the harvester which are not represented in the drawings were constructed in the same manner as the corresponding parts of the same class of harvesters then in use.

Figure 2:
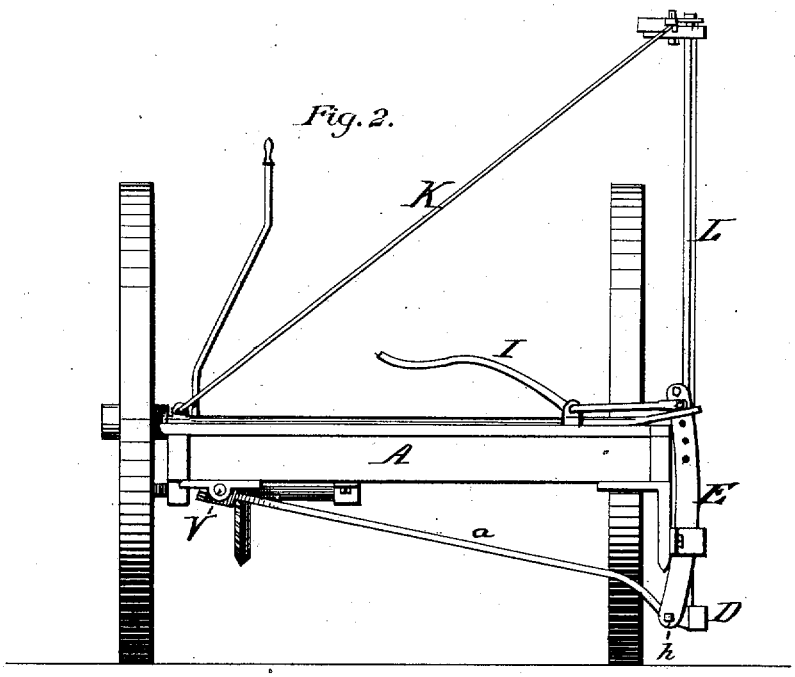
Figure 3:
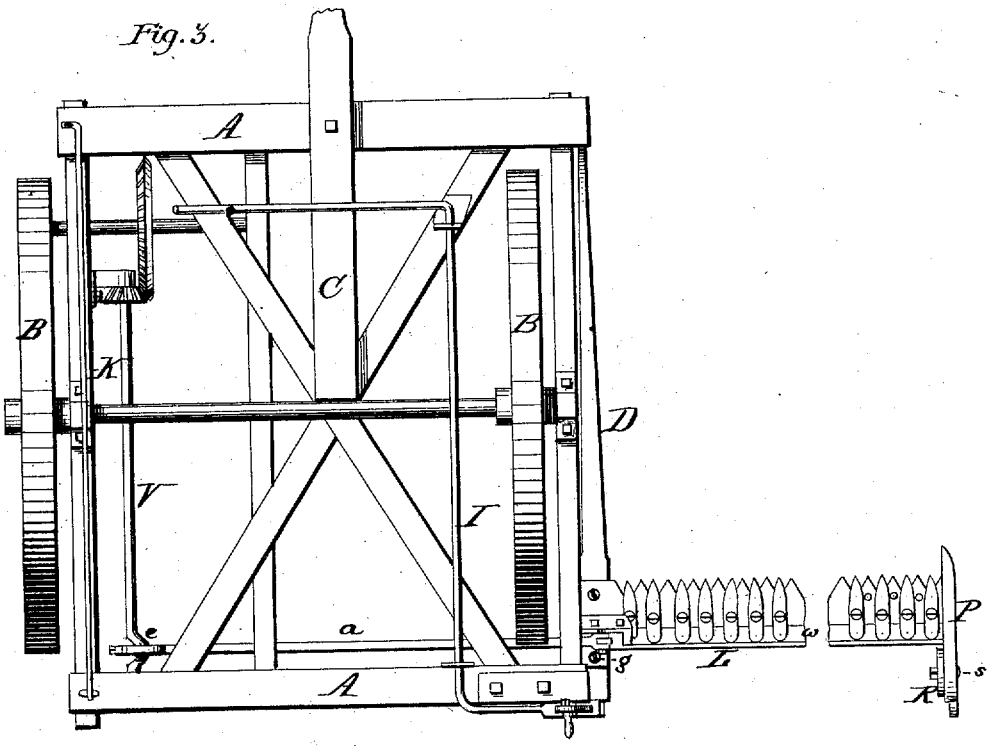
Figure 4:
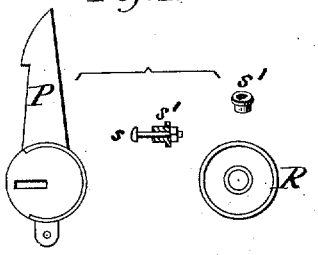
Figure 5:
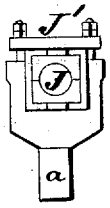
Figure 6:
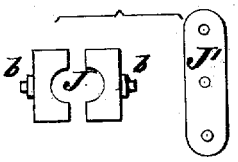
Figure 7:
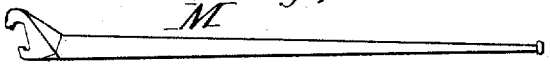

In the said drawings, Figure 1 represents a side elevation of the said machine. Fig. 2 is a rear view thereof, with the finger-beam turned up and secured, as it is when being moved to and from the field. Fig. 3 is a plan of the machine. Figs. 4 to 7, inclusive, represent certain parts of the machine detached from the residue, and designated by the same letters as they are in the other figures.

The main frame or driving-platform A of said machine is supported upon the two running-wheels B B, and is connected with the stiff tongue C, to which the horses are hitched, so that the said frame is caused to travel parallel or thereabout with the surface of the ground, instead of oscillating on the arms of the driving-axle. The finger-beam L is arranged to project laterally at one side of the main frame, so that the cutting apparatus is at one side of the said frame and of both the running-wheels thereof. This finger-beam sustains the fingers and cutters of the cutting apparatus, and it is secured at its inner end by screw-bolts *g g* to the upper side of a bar, D, which, being under the finger-beam and bent upward in front and behind it, constitutes a shoe for the inner end of the finger-beam. This bar is extended forward, and connected with a hook, N, at the front corner of the main frame, so as to act as a draw bar or brace for the finger-beam. The finger-beam is connected with the main frame by means of the link E, whose lower end is connected with the shoe D of the finger-beam by means of a hinge-pivot, *h*. This link is also connected with the main frame, so that its lower end may move up and down relatively to said frame without changing its position laterally thereof. By means of this link the finger-beam is held in its proper endwise position laterally of said frame, with the capacity of being raised and lowered bodily without changing its distance from the crank-shaft V that drives the cutters; and the finger-beam may also have its outer end turned up on or down upon the hinge-pivot *h* of the link, for the purpose of passing obstructions.

In order that the outer end of the finger-beam may be turned up independently of the inner end thereof, the hand-lever M is provided, and is connected with the finger-beam through the intervention of the shoe D. By operating upon the handle at the upper end of this hand-lever M, the driver on the main frame can raise or lower the outer end of the finger-beam, as may be found necessary, in passing obstructions.

In order that the inner end of the finger-beam may be raised or lowered by the driver on the main frame, the second lever I is provided. This lever is connected with the shoe of the finger-beam through the intervention of the link E, so that the driver, by pressing his foot upon the front end of the second lever I, can raise the inner end of the finger-beam; and by operating upon both levers he can raise and lower the finger-beam bodily, relatively to the main frame.

The inner end of the finger-beam may be held at any desired position above the ground by means of a pin inserted in one of a series of holes made in the link E, and when the machine is not cutting the finger-beam may be turned upright, as represented in Fig. 2, and held by a brace, K.

When the machine is cutting the outer end of the finger-beam is supported by the stubble-shoe P and shoe-wheel R, which last is connected with the stubble-shoe by the thimble *s'* and bolt *s*, the bolt being passed through a slot in the shoe, which permits its position to be changed, so that the outer end of the finger-beam may be set to run nearer to or farther from the ground.

The cutters are caused to reciprocate by reason of their connection with the stock or cutter-bar *w*, to which a reciprocating movement is imparted, by the revolving crank-wrist *e*, through the intervention of the connecting-rod *a*. The rocking of the finger-beam upon its longitudinal axis tends to twist or rock the connecting-rod on its longitudinal axis; and, in order that the crank-pin may not be strained by reason of such rocking or twisting, the journal-box J, at one end of the connecting-rod, is constructed to swivel on pivots *b*, Fig. 6, whose axes are in line with the longitudinal axis of the connecting-rod, or, in other words, are arranged longitudinally of the connecting-rod, one pivot turning in a socket in the body *a* of the rod, and the other pivot turning in a hole in the cap J' of the rod; hence, when the finger-beam rocks on its longitudinal axis or thereabout the swiveling of the journal-box on the longitudinally-arranged pivots which connect the journal-box and connecting-rod permit the box and rod to twist relatively to each other, and consequently the twisting-strain does not affect the crank-pin.

The jaws of the connecting-rod at each side of the journal-box are far enough apart to permit the swiveling of the box.

Having thus described the mode in which I embodied my improvements, I declare that I am aware that no one of the members of which my combination is composed is new when considered separately. I am also aware that a lever has been applied to the shoe of a finger-beam, for the purpose of raising and lowering the outer end thereof, but in such case the finger-beam was connected directly with the frame of the machine, and the frame had a limber tongue, so that the frame oscillated when the inner end of the finger-beam was raised and lowered. I am also aware that connecting-rods have been constructed with swivel-boxes having their pivots arranged crosswise of the length of the connecting-rod, in which arrangement the swiveling does not relieve the crank-pin from strains due to the rocking or twisting of the finger-beam upon its longitudinal axis; also, that the bodies of connecting-rods have been made in two parts connected so as to form a swivel-joint; but in such cases the longitudinal swiveling was not obtained by the construction and arrangement of the journal-boxes, but by the construction of the body of the connecting-rod. I therefore do not claim the invention of any one of the instrumentalities of which my new combinations are composed; nor do I claim other combinations of them than those which are specified in the following claims; but

I claim as my invention—

1. The combination, substantially as above set forth, of the finger-beam projecting laterally at one side of the main frame and stiff-draft tongue, and of both the running-wheels of the harvester, the hinged link connecting the finger-beam and main frame, and the hand-lever connected with the inner end of the finger-beam, for the purpose of turning up the outer end thereof upon the lower hinge-pivot of the said link as an axis.

2. The combination, substantially as before set forth, of the finger-beam projecting laterally at one side of the main frame and stiff-draft tongue, and of both the running-wheels of the harvester, the link connecting the finger-beam and main frame, the hand-lever connected with the inner end of the finger-beam, and the second lever upon the main frame.

3. The combination, substantially as before set forth, of the cutter-stock, the crank for driving the same, the connecting-rod, and the swivel journal-box of the connecting-rod, having its pivots arranged longitudinally of said connecting-rod.

Witness my hand this 29th day of May, A. D. 1875.

JOHN GORE.

Witnesses:
W. S. GUILD,
W. E. WAITE.